United States Patent
Hirsch et al.

(10) Patent No.: US 7,732,944 B2
(45) Date of Patent: Jun. 8, 2010

(54) CENTRAL CURRENT SHARE COORDINATOR, METHOD OF CURRENT SHARING AND BATTERY PLANT EMPLOYING THE SAME

(75) Inventors: Marc D. Hirsch, Dallas, TX (US); John C. Brooke, Dallas, TX (US); Roy J. Davis, Rowlett, TX (US)

(73) Assignee: Lineage Power Corporation, Mesquite, TX (US)

( * ) Notice: Subject to any disclaimer, the term of this patent is extended or adjusted under 35 U.S.C. 154(b) by 882 days.

(21) Appl. No.: 11/109,510

(22) Filed: Apr. 19, 2005

(65) Prior Publication Data

US 2006/0232136 A1 Oct. 19, 2006

(51) Int. Cl.
*H02J 1/10* (2006.01)
(52) U.S. Cl. .......................................... 307/56; 307/58
(58) Field of Classification Search .................. 307/64, 307/52, 56, 58
See application file for complete search history.

(56) References Cited

U.S. PATENT DOCUMENTS

| 5,815,389 A | * | 9/1998 | Plow et al. ..................... 363/67 |
| 6,650,092 B1 | * | 11/2003 | Lidak et al. ................. 323/207 |
| 7,170,194 B2 | * | 1/2007 | Korcharz et al. ............. 307/21 |

FOREIGN PATENT DOCUMENTS

| DE | 102 10 164 A1 | * | 9/2003 |
| JP | 10201104 | * | 7/1998 |

* cited by examiner

*Primary Examiner*—Michael Rutland Wallis

(57) ABSTRACT

The present invention provides a central current share coordinator for use with remotely and non-remotely controllable rectifiers coupled to an output bus. In one embodiment, the central current share coordinator includes a rectifier current resolver configured to determine an existing current share condition for the remotely and non-remotely controllable rectifiers. Additionally, the central current share coordinator also includes a load share adjuster coupled to the rectifier current resolver and configured to adjust an output current of the remotely controllable rectifiers toward a target current share distribution on the output bus.

18 Claims, 2 Drawing Sheets

CENTRAL CURRENT SHARE COORDINATOR, METHOD OF CURRENT SHARING AND BATTERY PLANT EMPLOYING THE SAME

TECHNICAL FIELD OF THE INVENTION

The present invention is directed, in general, to power systems and, more specifically, to a central current share coordinator, a method of current sharing and a battery plant employing the coordinator or the method.

BACKGROUND OF THE INVENTION

Telecommunication and data switching systems are used to route tens of thousands of calls and data connections per second. The failure of such a system, due to either an equipment breakdown or a loss of power, is generally unacceptable since it would result in a loss of millions of voice and data communications along with its corresponding revenue. The traditionally high reliability of telecommunication systems, that users have come to expect, is partially based on the use of redundant equipment including power supplies.

Primary power is normally supplied through commercially available AC voltage. Should the AC voltage become unavailable due to an AC power outage or the failure of one or more of its associated components, a backup power capability supplies the needed voltages and currents to maintain operation of the system. This backup power capability can be provided by a battery plant, which generally includes a number of backup batteries as well as corresponding rectifying, inverting and associated power distribution equipment. The backup batteries provide power to the load in the event an AC power outage occurs. During normal operation, the backup batteries are usually maintained in a substantially fully-charged state to provide as long a duration for backup power as possible.

Multiple rectifier systems are connected to the battery plant's output bus to provide the needed load current by the telecommunication systems or other load equipment and maintain the battery charge, during these normal operating periods. These multiple rectifier systems may employ a disparate collection of rectifiers ranging from older embedded legacy rectifiers, whose output voltage and current values are not remotely controllable, to newly installed rectifiers that provide remote control capability of these functions.

The ability to determine how a load current will be shared between these multiple rectifier systems is an important consideration when loads are static. However, as loads become dynamic and the load current varies significantly, the question of how the load current is shared between multiple rectifier systems may become critical to efficient or even successful plant operation.

Older rectifier systems typically provide a manually-settable current share capability that accommodates load current sharing among only the older rectifier systems. Correspondingly, newer rectifier systems provide load current share capability among only the newer rectifier systems. However, the two types of rectifier systems do not provide a common current share, either by physical bus or otherwise, and are not currently able to actively current share. This is especially true when they are provided by different vendors.

Accordingly, what is needed in the art is a way to provide load current sharing between older and newer rectifier systems having differing load current share capabilities.

SUMMARY OF THE INVENTION

To address the above-discussed deficiencies of the prior art, the present invention provides a central current share coordinator for use with remotely and non-remotely controllable rectifiers coupled to an output bus. In one embodiment, the central current share coordinator includes a rectifier current resolver configured to determine an existing current share condition for the remotely and non-remotely controllable rectifiers. Additionally, the central current share coordinator also includes a load share adjuster coupled to the rectifier current resolver and configured to adjust an output current of the remotely controllable rectifiers toward a target current share distribution on the output bus.

In another aspect, the present invention provides a method of current sharing for use with remotely and non-remotely controllable rectifiers coupled to an output bus. The method includes determining an existing current share condition for the remotely and non-remotely controllable rectifiers and adjusting an output current of the remotely controllable rectifiers toward a target current share distribution on the output bus.

The present invention also provides, in yet another aspect, a battery plant that includes a battery string coupled to an output bus, remotely and non-remotely controllable rectifiers coupled to the output bus, a power system controller coupled to the remotely and non-remotely controllable rectifiers and a central current share coordinator coupled to the power system controller. The central current share coordinator includes a rectifier current resolver that determines an existing current share condition for the remotely and non-remotely controllable rectifiers. The central current share coordinator also includes a load share adjuster, coupled to the rectifier current resolver, that adjusts an output current of the remotely controllable rectifiers toward a target current share distribution on the output bus.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
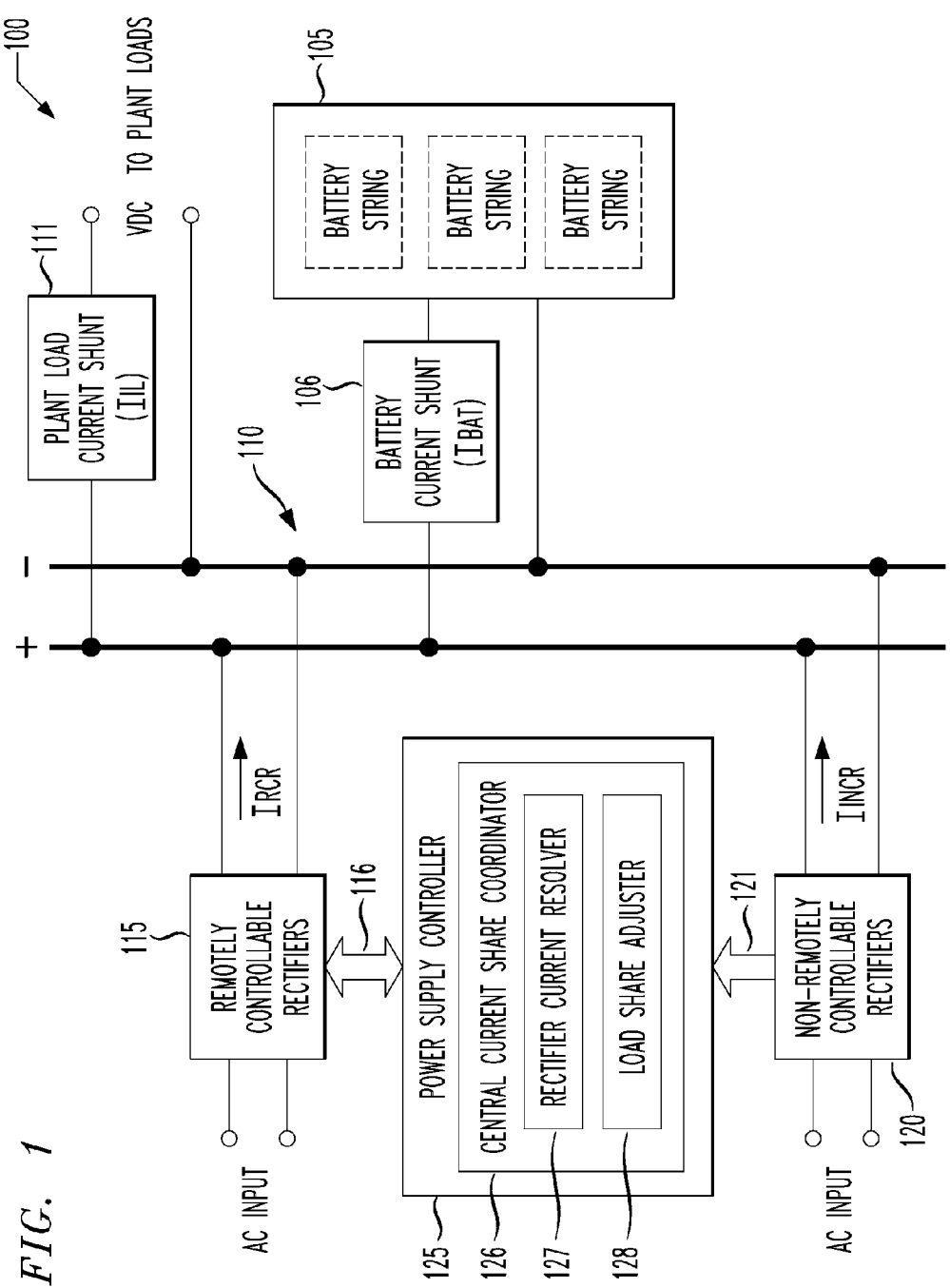
FIG. 1 illustrates a block diagram of an embodiment of a battery plant constructed in accordance with the principles of the present invention.

Referring initially to FIG. 1, illustrated is a block diagram of an embodiment of a battery plant, generally designated 100, constructed in accordance with the principles of the present invention. The battery plant includes a collection of battery strings 105, associated with a battery current $I_{BAT}$ and coupled to an output bus 110 having positive and negative conductors, that provides a plant load current $I_L$ to battery plant loads. The battery plant 100 also includes remotely controllable rectifiers 115 and non-remotely controlled rectifiers 120 that are directly connected to the output bus 110. They convert input AC power into a DC output voltage for the output bus 110 and also provide a remotely controllable rectifier output current $I_{RCR}$ and a non-remotely controlled rectifier output current $I_{NCR}$ to the output bus 110, respectively.

The battery plant 100 further includes a power supply controller 125 that is coupled to the remotely controllable rectifiers 115 employing a serial bus 116 and to the non-remotely controlled rectifiers 120 employing a parallel cable 121. The power supply controller 125 is also coupled to a plant load current shunt 111 that provides a representation of the plant load current $I_L$ and to a battery current shunt that similarly provides a representation of the battery current $I_{BAT}$. The power supply controller 125 includes a central current share coordinator 126 having a rectifier current resolver 127 and a load share adjuster 128. The rectifier current resolver 127 determines an existing current share condition for the remotely and non-remotely controllable rectifiers 115, 120. The load share adjuster 128 is coupled to the rectifier current resolver 127 and adjusts the remotely controlled rectifier output current $I_{RCR}$ toward a target current share distribution on the output bus 110.

The remotely controllable rectifiers 115 are configurable remotely employing the central current share coordinator 126 and the serial bus 116 in a daisy chain method of direct digital communication. The daisy chain method of communication allows a broadcast mode affecting all, a group mode affecting a subset or an individual mode affecting only one of the remotely controlled rectifiers 115. The serial bus 116 allows the remotely controllable rectifiers 115 to indicate the remotely controlled rectifier output current $I_{RCR}$ to the rectifier current resolver 127 on either a reporting basis or a polling basis. Of course, one skilled in the pertinent art will recognize that configurations other than a daisy chain may be employed such as a star network, a mesh configuration or even a wireless connection, as considered appropriate to a particular application.

The parallel cable 121 is employed to receive status and rectifier output current information from each of the non-remotely controlled rectifiers 120 but provides no current share control capability. Certain types of non-remotely controlled rectifiers 120 provide a unique voltage representation of their output currents to the rectifier current resolver 127 employing a voltage that is proportional to the rectifier output current. Other types require a proper scaling of shunt readings by the rectifier current resolver 127 in order to achieve proper rectifier currents. Of course, one skilled in the pertinent art will recognize that communication schemes other than parallel may be employed to receive the status and rectifier output current information, such as serial or wireless connections.

A plant output voltage $V_{DC}$ is provided by the output bus 110. The plant output voltage $V_{DC}$ is controlled by the voltage output setting of the non-remotely controllable rectifiers 120, since their output voltage is manually adjusted and therefore not dynamically changeable. When the remotely controlled rectifier output current $I_{RCR}$ is adjusted toward the target current share distribution by the load share adjuster 128, an output voltage of the remotely controllable rectifier 115 typically differs from the plant output voltage $V_{DC}$ initially, thereby perturbing the plant output voltage $V_{DC}$ slightly. However, since both the remotely and non-remotely controllable rectifiers 115, 120 are directly connected to the output bus 110, the voltage regulation system of the non-remotely controllable rectifiers 120 prevails in controlling the plant output voltage $V_{DC}$ as the target current share distribution is effected.

Generally, the remotely controllable rectifiers 115 respond more quickly to directed current share adjustments than the non-remotely controllable rectifiers 120. The load share adjuster 128 accommodates a general difference in response times by providing a time latency in adjusting the remotely controlled rectifier output current $I_{RCR}$ toward the target current share distribution. In the illustrated embodiment, the load share adjuster 128 provides smaller, step-wise adjustments in the remotely controlled rectifier output current $I_{RCR}$ over a sufficient period of time that prevents overshoot or hunting associated with the adjustment. In an alternative embodiment, the load share adjuster 128 provides a substantially linear adjustment over the sufficient period of time.

In the illustrated embodiment, the remotely controllable rectifiers 115 consist of four 50 ampere rectifiers that provide 200 amperes of capacity for the remotely controllable rectifier output current $I_{RCR}$. Analogously, the non-remotely controllable rectifiers 120 consist of a 200 ampere rectifier and a 400 ampere rectifier that provide 600 amperes of capacity for the non-remotely controlled rectifier output current $I_{NCR}$. This combination thereby provides an active capacity of 800 amperes. Of course, other embodiments of the present invention may employ only one rectifier in each of the remotely and non-remotely controllable rectifiers 115, 120. Additionally, other inactive rectifiers may be present that are not currently contributing power to the plant loads and may become active at a later time. Inactive rectifier conditions may result from rectifiers in a standby mode, having AC Failure (ACF) Alarms, Rectifier Failure Alarms (RFA) or be off-line for maintenance, for example.

The non-remotely controllable rectifiers 120 are typically older, embedded legacy rectifiers that have been in service for some extended period of time and still function reliably. Although not remotely controllable with respect to a current sharing capability, most are capable of indicating or reporting their output current to the power supply controller 125. Initially, the non-remotely controllable rectifiers 120 have their output voltages adjusted to an appropriate output voltage set point and in a manner that allows them to appropriately share current prior to the addition of the remotely controllable rectifiers 115. Additionally, their individual capacity ratings are properly configured in the power supply controller 125. Since conditions affecting rectifier usage is often dynamic, performance of the procedures indicated above for the non-remotely controlled rectifiers 120 typically occurs when employing a different active non-remotely controlled rectifier configuration. This ensures that the non-remotely controllable rectifiers 120 current share in an intended manner.

In one embodiment, the rectifier current resolver 127 obtains and properly converts all rectifier outputs to determine a total rectifier output current consisting of the remotely controllable rectifier output current $I_{RCR}$ and the non-remotely controlled rectifier output current $I_{NCR}$. In an alternative embodiment, only a portion of the non-remotely controllable rectifiers 120 is able to indicate an output current. A small percentage of the oldest legacy rectifiers are not able to indicate their individual output currents to the rectifier current resolver 127.

For non-remotely controllable rectifiers 120 with these types of rectifiers, the plant load current $I_L$ and the battery current $I_{BAT}$ may be used to approximate the total rectifier output current using the plant load current and battery current shunts 111, 106. The load share adjuster 128 may be employed to provide an appropriate target current share distribution based on the following:

$$I_{NCR}=I_L-I_{BAT}-I_{RCR}. \quad (1)$$

For this case, the non-remotely controllable rectifier output current $I_{NCR}$ thereby consists of an unknown non-remotely controllable rectifier output current $I_{UNCR}$ and a known non-remotely controllable rectifier output current $I_{KNCR}$. Thus, the unknown non-remotely controllable rectifier output current $I_{UNCR}$ may be determined if needed. However, the rectifier current resolver 127 usually employs the non-remotely controllable rectifier output current $I_{NCR}$, since the non-remotely controllable rectifiers 120 are usually adjusted to provide current load sharing in an appropriate fashion.

A typical goal of the central current share coordinator 126 is to employ the target current share distribution to provide a pro rata current share that is proportional to each of the capacities of the remotely and non-remotely controllable rectifiers 115, 120. For the exemplary capacities chosen above and for a combined rectifier output current ($I_{RCR}+I_{NCR}$) of 400 amperes, a target current share distribution of 50 percent may be employed. Therefore the remotely controllable rectifiers 115 provide 100 amperes, and the non-remotely controllable rectifiers 120 provide 300 amperes, which is respectively 100 amperes and 200 amperes from each of the separate rectifiers comprising the non-remotely controllable rectifiers 120. In actual practice, obtaining a current share distribution through dynamically controlling the remotely controllable rectifiers 115 that is within about 10 percent of the target current share distribution is often acceptable.

The efficiency of the older, embedded legacy rectifiers employed in the non-remotely controllable rectifiers 120 often decreases for lower values of its rectifier output current and corresponding lower levels of the plant load current $I_L$. For this case, the load share adjuster 128 may provide a target current share distribution that assigns a higher proportional current share to the non-remotely controllable rectifiers 120, since the remotely controllable rectifiers 115 provide efficient operation over a broader range of rectifier output currents. In this case, the target current share distribution is no longer based on each capacity of the remotely and non-remotely controllable rectifiers 115, 120, but rather, a greater current share is assigned to the non-remotely controllable rectifiers 120 based on the plant load current $I_L$. Of course, these cases are exemplary, and other embodiments of target current share distributions may be employed as appropriate to a particular application.

Figure 2:
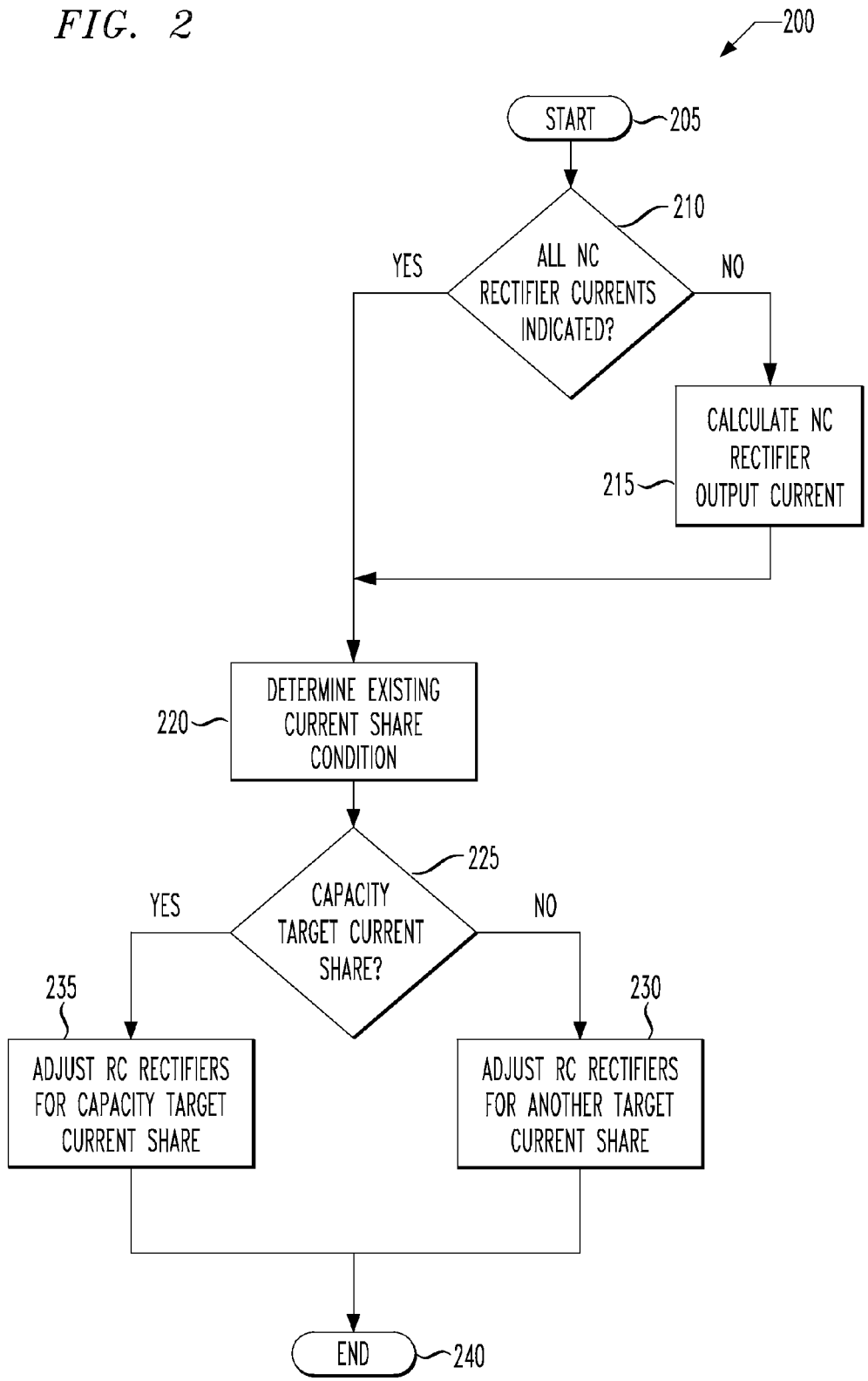
FIG. 2 illustrates a flow diagram of an embodiment of a method of current sharing carried out in accordance with the principles of the present invention.

Turning now to FIG. 2, illustrated is a flow diagram of an embodiment of a method of current sharing, generally designated 200, carried out in accordance with the principles of the present invention. The method 200 is for use with remotely and non-remotely controllable rectifiers coupled to an output bus and starts in a step 205. Then, in a first decisional step 210 it is determined if all non-remotely controllable rectifiers are indicating their rectifier output currents. If all of the non-remotely controllable rectifiers are indicating their rectifier output currents, an existing current share condition for the remotely and non-remotely controllable rectifiers is determined in a step 220. The existing current share condition may be determined in the step 220 since the rectifier output current for the remotely controllable rectifiers is always known.

If it is determined in the first decisional step 210 that not all of the non-remotely controllable rectifiers are indicating their rectifier output currents, the rectifier output current for the non-remotely controllable rectifiers is determined in a step 215. Determination of this rectifier output current in the step 215 employs taking a difference between a load current and a summation of a reserve current and the rectifier output current for the remotely controllable rectifiers.

The load current represents a total current being supplied by the output bus that couples the remotely and non-remotely controllable rectifiers. The reserve current represents an excess current, which becomes either part of the load current or enhances a battery reserve for future use. The reserve current becomes part of the load current when a total rectifier output current of the remotely and non-remotely controllable rectifiers is less than that needed for the load current. Alternatively, the reserve current enhances the battery reserve when the total rectifier output current of the remotely and non-remotely controllable rectifiers is greater than that needed for the load current. Calculation of the rectifier output current associated with the non-remotely controllable rectifiers allows the existing current share condition to be determined in the step 220.

In a second decisional step 225, it is determined if a target current share distribution is based on capacities of the remotely and non-remotely controllable rectifiers. If the target current share distribution is based on capacities, the rectifier output current of the remotely controllable rectifiers is adjusted toward a target current share distribution, which is based on each of the capacities. This adjustment provides a corresponding response in the output current of the non-remotely controllable rectifiers provided by the common coupling to the output bus and a previously-decided non-remotely controllable rectifier current share allocation. This adjustment is provided over a sufficient time interval to avoid unnecessary perturbations in rectifier output currents thereby providing a smooth transition. The method 200 then ends in a step 240.

If it is decided in the second decisional step 225 that a target current share distribution is not based on capacities of the remotely and non-remotely controllable rectifiers, then another basis for current sharing between the remotely and non-remotely controllable rectifiers is provided in a step 230. One such basis corresponds to adjusting toward a target current share distribution based on increasing or maintaining an efficiency of the non-remotely controllable rectifiers. Of course, the target current share distribution may employ another basis as deemed appropriate to a particular application or situation. The method 200 again ends in the step 240, as before.

While the method disclosed herein has been described and shown with reference to particular steps performed in a particular order, it will be understood that these steps may be combined, subdivided, or reordered to form an equivalent method without departing from the teachings of the present invention. Accordingly, unless specifically indicated herein, the order or the grouping of the steps is not a limitation of the present invention.

In summary, embodiments of the present invention employing a central current share coordinator, a method of current sharing and a battery plant using the coordinator or the method have been presented. Advantages include the ability to blend remotely and non-remotely controllable rectifiers and dynamically affect current sharing between the two types in a predetermined manner by adjusting only the remotely controllable rectifiers. The current sharing may be based on the capacities of each of the remotely and non-remotely controllable rectifiers, or it may be based on another quantity, such as efficiency. Advantages also include the ability to determine rectifier output currents that are not available for the non-remotely controllable rectifiers, which are then used along with indicated rectifier output currents to provide a target current share distribution.

Although the present invention has been described in detail, those skilled in the art should understand that they can make various changes, substitutions and alterations herein without departing from the spirit and scope of the invention in its broadest form.

What is claimed is:

1. A central current share coordinator for use with remotely controllable rectifiers and non-remotely controllable rectifiers coupled to a common output bus, comprising:
   a rectifier current resolver configured to determine an existing current share condition for said remotely controllable rectifiers and said non-remotely controllable rectifiers, wherein at least a portion of said non-remotely controllable rectifiers indicates an output current; and
   a load share adjuster coupled to said rectifier current resolver and configured to adjust an output current of said remotely controllable rectifiers toward a target current share distribution between said remotely controllable and said non-remotely controllable rectifiers on said common output bus, wherein said remotely controllable rectifiers and said non-remotely controllable rectifiers convert alternating current (AC) power from separate AC sources to a direct current (DC) output voltage.

2. The coordinator as recited in claim 1 wherein said target current share distribution provides a pro rata current share based on capacities of said remotely and non-remotely controllable rectifiers.

3. The coordinator as recited in claim 1 wherein said target current share distribution depends on a load current.

4. The coordinator as recited in claim 1 wherein said remotely controllable rectifiers employ a serial bus structure to provide individual addressability.

5. The coordinator as recited in claim 1 wherein said remotely controllable rectifiers indicate an output current employing one of a reporting basis and a polling basis.

6. The coordinator as recited in claim 1 wherein only one of each type of said remotely and non-remotely controllable rectifiers is employed.

7. A method of current sharing for use with remotely controllable rectifiers and non-remotely controllable rectifiers coupled to a common output bus, comprising:
   providing alternating current (AC) power to said remotely controllable rectifiers and said non-remotely controllable rectifiers from separate AC sources;
   converting said AC power by said remotely controllable and non-remotely controllable rectifiers to a direct current (DC) output;
   determining an existing current share condition for said remotely controllable rectifiers and said non-remotely controllable rectifiers, wherein at least a portion of said non-remotely controllable rectifiers indicates an output current; and
   adjusting an output current of said remotely controllable rectifiers toward a target current share distribution between said remotely controllable and said non-remotely controllable rectifiers on said common output bus.

8. The method as recited in claim 7 wherein said target current share distribution provides a pro rata current share based on capacities of said remotely and non-remotely controllable rectifiers.

9. The method as recited in claim 7 wherein said target current share distribution depends on a load current.

10. The method as recited in claim 7 wherein said remotely controllable rectifiers employ a serial bus structure to provide individual addressability.

11. The method as recited in claim 7 wherein said remotely controllable rectifiers indicate an output current employing one of a reporting basis and a polling basis.

12. The method as recited in claim 7 wherein only one of each type of said remotely and non-remotely controllable rectifiers is employed.

13. A battery plant, comprising:
   a battery string coupled to a common output bus;
   remotely controllable rectifiers and non-remotely controllable rectifiers coupled to said common output bus, wherein at least a portion of said non-remotely controllable rectifiers indicates an output current and wherein said remotely controllable and said non-remotely controllable rectifiers convert alternating current (AC) power from separate AC sources to a direct current (DC) output voltage;
   a power system controller coupled to said remotely controllable rectifiers and said non-remotely controllable rectifiers; and
   a central current share coordinator coupled to said power system controller, including:
      a rectifier current resolver that determines an existing current share condition for said remotely controllable rectifiers and said non-remotely controllable rectifiers, and
      a load share adjuster, coupled to said rectifier current resolver, that adjusts an output current of said remotely controllable rectifiers toward a target current share distribution between said remotely controllable and said non-remotely controllable rectifiers on said common output bus.

14. The system as recited in claim 13 wherein said target current share distribution provides a pro rata current share based on capacities of said remotely and non-remotely controllable rectifiers.

15. The system as recited in claim 13 wherein said target current share distribution depends on a load current.

16. The system as recited in claim 13 wherein said remotely controllable rectifiers employ a serial bus structure to provide individual addressability.

17. The system as recited in claim 13 wherein said remotely controllable rectifiers indicate an output current employing one of a reporting basis and a polling basis.

18. The system as recited in claim 13 wherein only one of each type of said remotely and non-remotely controllable rectifiers is employed.

* * * * *